US009591064B2

(12) United States Patent
Bitar

(10) Patent No.: US 9,591,064 B2
(45) Date of Patent: Mar. 7, 2017

(54) METHOD AND APPARATUS FOR DYNAMIC PROVISIONING OF COMMUNICATION SERVICES

(71) Applicant: Verizon Patent and Licensing Inc., Arlington, VA (US)

(72) Inventor: Nabil N. Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 247 days.

(21) Appl. No.: 14/230,977

(22) Filed: Mar. 31, 2014

(65) Prior Publication Data

US 2015/0280980 A1 Oct. 1, 2015

(51) Int. Cl.
*G06F 15/16* (2006.01)
*H04L 29/08* (2006.01)
*H04L 12/24* (2006.01)

(52) U.S. Cl.
CPC .......... *H04L 67/10* (2013.01); *H04L 41/5051* (2013.01); *H04L 67/306* (2013.01); *H04L 67/34* (2013.01)

(58) Field of Classification Search
CPC .... H04L 41/5051; H04L 67/34; H04L 67/306
USPC .......................................................... 709/219
See application file for complete search history.

(56) References Cited

U.S. PATENT DOCUMENTS

2014/0108474 A1* 4/2014 David ..................... G06F 17/30 707/827
2014/0181187 A1* 6/2014 Stevens ................. H04L 67/322 709/203
2015/0172367 A1* 6/2015 Said ...................... H04L 67/306 709/204

* cited by examiner

*Primary Examiner* — Phuoc Nguyen

(57) ABSTRACT

An approach is provided for determining a cloud provider identifier associated with a request to provision one or more communication services. The approach further involves validating the request by matching the cloud provider identifier against another copy of the cloud provider identifier associated with a session over which the provisioning request was received.

20 Claims, 7 Drawing Sheets

300

METHOD AND APPARATUS FOR DYNAMIC PROVISIONING OF COMMUNICATION SERVICES

BACKGROUND INFORMATION

Service providers are continually challenged to deliver value and convenience to consumers by, for example, providing compelling network services. One area of development has been the use of cloud based computing for their increased networking bandwidth and processing power of the networked computers. This convenience has spawned significant adoption by an ever growing number of consumers as an accepted mode of communication for business and personal uses. As the number of users increases, the performance of these networks can degrade. At present, communication services allocation is performed mainly in a static way, on time scales on the order of hours to months. However, statically provisioned communication services can become insufficient or considerably under-utilized. A key challenge is the development of solutions that can dynamically allocate communication services efficiently, satisfying the requirements of users while aiming at maximizing, at the same time, resource utilization and network revenue.

Therefore, efficient dynamic provisioning of communication services is necessary. The goal may be to offer services that satisfy the requirements of individual users while guaranteeing at the same time an efficient utilization of network resources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for determining a cloud provider identifier associated with a request and validating the request to provision one or more communication services, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the preferred embodiments of the invention.

A dynamic deployment allows optimized distribution of communication services within a certain infrastructure. A dynamic service provisioning, for instance, dynamic resource allocation and dynamic deployment of services in a distributed environment enables high flexibility and optimized usage of the infrastructure. Further, it reduces the costs for data transfer and avoids long waits on data. Therefore, there is a need for a set of schema for dynamic provisioning of network services on demand, whereby the cloud orchestrator determines a cloud provider identifier associated with a request and validates the request to provision one or more communication services.

Figure 1:
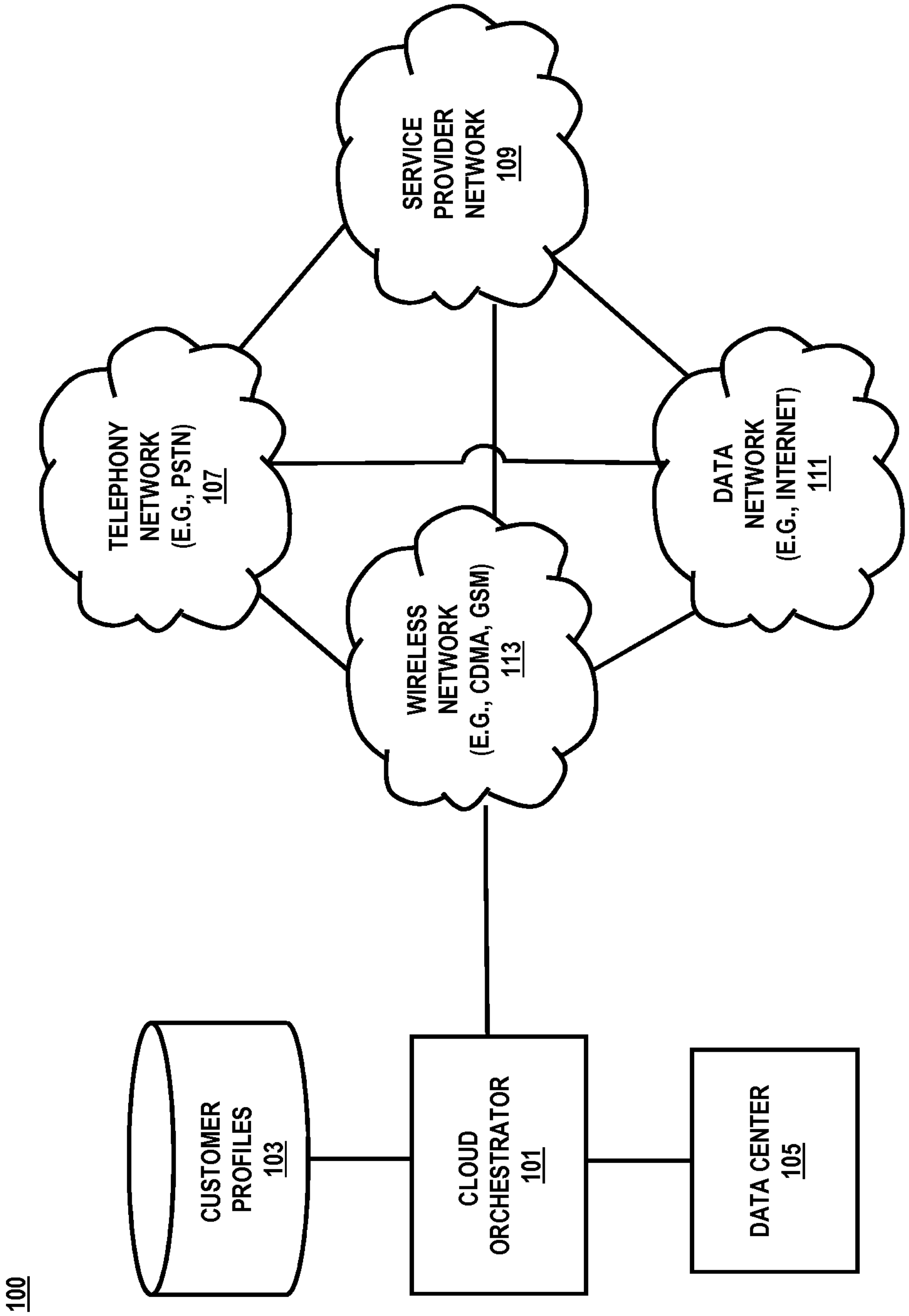
FIG. 1 is a diagram of a system capable of determining a cloud provider identifier associated with a request and validating the request to provision one or more communication services, according to an exemplary embodiment.

FIG. 1 is a diagram of a system capable of determining a cloud provider identifier associated with a request and validating the request to provision one or more communication services, according to exemplary embodiment. For the purposes of illustration, system 100 for providing communication services to request sending cloud provider is described. In one embodiment, the cloud orchestrator 101 has connectivity to data center 105 and customer profiles database 103 via networks 107, 109, 111 and 113.

In exemplary embodiments, any number of customers may access the cloud orchestrator 101 through any mixture of tiered public and/or private communication networks. According to certain embodiments, these public and/or private communication networks can include a data network, a telephony network, and/or wireless network. For example, the telephony network may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), general packet radio service (GPRS), mobile ad hoc network (MANET), global system for mobile communications (GSM), universal mobile telecommunications system (UMTS), etc., as well as any other suitable wireless medium, e.g., microwave access (WiMAX), wireless fidelity (WiFi), satellite, and the like. Additionally, the data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In one embodiment, the cloud orchestrator 101 accesses a customer profiles database 103 to determine the communication services to be applied. Depending on the involved security and network services, the cloud orchestrator 101 may route the request through the public networks 107-113. In one embodiment, the cloud orchestrator 101 may examine customer information stored in a customer profiles database 103, which contains information pertaining to the customers associated with the session over which the service provisioning request is received.

In one embodiment, based on request validation, relevant data that can be used to generate recommendations and insight is propagated to the cloud orchestrator 101, in accordance with policies, through a cloud interface which may be independent from the data model used. The policies may be stored in local storage 217, in the cloud orchestrator 101, or a combination thereof. The networks 107-113 are similarly configured with a policy that causes a reaction to new device data and in turn, initiate processing.

The approach of the system 100 stems, in part, from the recognition that there is a need for dynamic provisioning of communication services for maximizing resource utilization and satisfying the customer requirements.

As shown, the system 100 includes the cloud orchestrator 101 implemented as, for example, part of a cloud service provider operating a Data Center 105 for determining a service provider network and a customer network, or a service provider network 109 for determining a cloud provider identifier and a customer network associated with a request and validating the request to provision one or more communication services. However, in alternative embodiments, the cloud orchestrator 101 could be implemented as any part of the system 100 or a hybrid of such parts.

In one embodiment, the service provider network 109 can interact with one or more other networks, such as a telephony network 107, a data network 111, and/or a wireless network 113.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100.

In one embodiment, the cloud orchestrator 101 may be a platform with multiple interconnected components. The cloud orchestrator 101 may include multiple servers, intelligent networking devices, computing devices, components and corresponding software for determining a cloud provider identifier and/or network service provider identifier associated with a request and validating the request to provision one or more communication services and other services. In one scenario, computing on the cloud requires vigilance about security, manageability, standards, governance, and compliance. Therefore, the cloud orchestrator 101 encapsulates rules and behaviors for cloud infrastructures around datacenter constructs (storage, compute cluster, network, security, etc.) that an application might need. The Cloud orchestrator 101 may represent the rules and behaviors unique to each cloud provider, thereby capturing the best practices on any given cloud.

In one embodiment, a cloud orchestrator 101 may determine, at least in part, a valid request from a cloud provider, wherein a valid request comprises of a valid identification for a cloud provider, and a customer and associated customer network. In one embodiment, cloud orchestrator 101 may receive a request from a cloud provider for provisioning of one or more communication services, whereby the cloud orchestrator 101 may determine a cloud provider identifier and may initiate a process for validating the request. Then, the cloud orchestrator 101 matches the cloud provider identifier against another copy of the cloud provider identifier associated with a session to validate the request. In one embodiment, validating a request may be further based on matching one or more parameters in the request against the context of a cloud provider associated with the cloud provider identifier.

In one embodiment, the cloud orchestrator 101 may process and/or facilitate processing of information associated with one or more cloud providers to cause, at least in part, a matching of the one or more parameters in the request against the context of a cloud provider. In one embodiment, the cloud orchestrator 101 upon determining that the one or more parameters in the request matches the context of a cloud provider, may initiate provisioning the one or more requests based on the validating of the requesting. Thereby, the cloud orchestrator 101 may cause, at least in parts, a dynamic provisioning of communication services. In one scenario, the cloud orchestrator 101 may cause a dynamic provisioning of virtual private network services, whereby one or more virtual private networks or virtual private network connections may be established over a service provider packet switched network. Such a virtual private network can be on multi-protocol label switching-based technology and/or Internet protocol technology.

In one embodiment, the cloud orchestrator 101 may process and/or facilitate a processing of the one or more cloud providers to determine one or more criteria, one or more parameters, or a combination thereof for initiating a provisioning the one or more requests based on the validating of the requesting. In one embodiment, one or more criteria may include one or more data types, one or more access technology types, one or more network interactions, network availability information, resource availability information, device capability information, contextual information or a combination thereof. In one embodiment, one or more parameters may include a customer identifier, a shared secret, service profile information, or a combination thereof. In one embodiment, the cloud orchestrator 101 causes, at least in part, an orchestration of one or more network systems based, at least in part, on the matching.

In one embodiment, the cloud orchestrator 101 may cause a parsing of the request to determine one or more operation codes and/or one or more service parameters, and may further generate a response message indicating a status of the provisioning.

In one embodiment, the cloud orchestrator 101 action may be triggered by a customer ordering a service or modification of a service, or an application automatically calling the cloud orchestrator 101. The application may automatically generate parameters used in making a provisioning request in order to better utilize network resources and quickly and efficiently apply changes to customer provisions. In this way, use of certain applications requiring greater network resources may expand provisioned resources. In other embodiments, exiting an application may automatically reduce the provisioned resources.

In one embodiment, data center 105 may be a centralized repository, either physical or virtual, for the storage, management, and dissemination of data and information organized around a particular infrastructure. In one embodiment, the cloud orchestrator 101 upon causing, at least in part, a matching of one or more strings selected by the at least one cloud provider may cause dynamic provisioning of WAN services between the network service provider and data center 105 of the cloud provider. In one scenario, the cloud orchestrator 101 may include utilization of a set of shared computing resources which may be consolidated in one or more data center 105.

Figure 2:
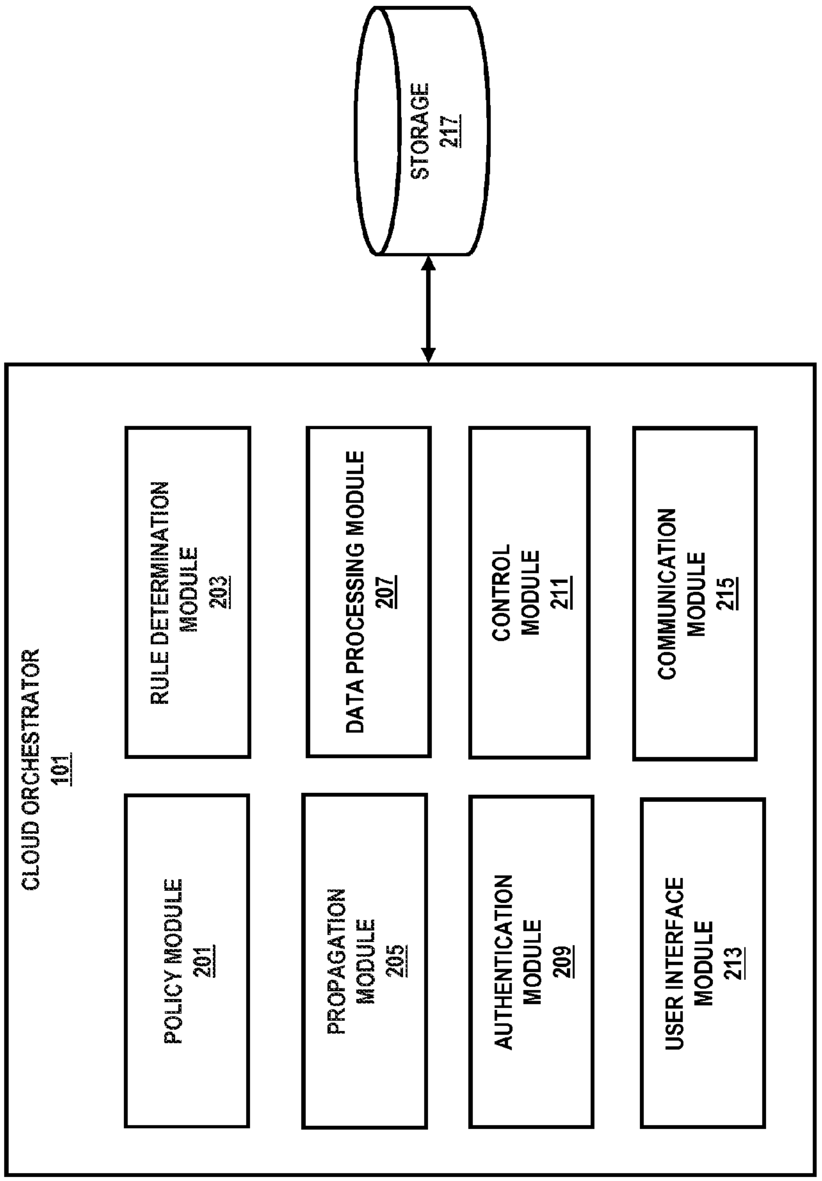
FIG. 2 is a diagram of the components of the cloud orchestrator 101, according to one embodiment.

FIG. 2 is a diagram depicting the components of the cloud orchestrator 101, according to one embodiment. The cloud orchestrator 101 includes various executable modules for performing one or more computing, data processing and network based instructions that in combination provide a means for determining a cloud provider identifier associated with a request and validating the request to provision one or more communication services. Such modules can be implemented in hardware, firmware, software or a combination thereof. By way of example, the cloud orchestrator 101 may include a policy module 201, a rule determination module 203, a propagation module 205, a data processing module 207, an authentication module 209, a control module 211, a user interface module 213, and a communication module 215. These modules 201-215 can interact with storage 217 in support of their functions. According to some embodiments, the storage 217 is maintained and updated based, at least in part, on one or more transactions conducted with user devices pertaining to various applications and functions of the cloud orchestrator 101.

In one embodiment, the policy module 201 determines one or more schema for dynamic provisioning of network services. The schema may be associated with determining a request sending cloud provider identifier and validating the request for the provisioning of one or more communication services. The policy module 201 may also determine one or more policies for initiating a provisioning of the one or more requests based on the validating of the requesting. In one embodiment, the policy module 201 may determine that a validation of a request for one or more communication services may include matching of the one or more parameters against the context of a cloud service provider. In one embodiment, the policy module 201 may determine that the one or more parameters may include a customer identifier and/or a shared secret and/or a service profile information. The policies may be retrieved by the other modules for processing from the storage 217.

In one embodiment, the rule determination module 203 processes the one or more policies to determine one or more rules, one or more criteria, or a combination thereof for the dynamic provisioning of communication services. The rule determination module 203 determines the one or more rules, the one or more criteria, or a combination thereof based, at least in part, on one or more data types, one or more propagation types, one or more network interactions, network availability information, resource availability information, device capability information, temporal information, contextual information, or a combination thereof.

The propagation module 205 processes the one or more policies to cause, at least in part, a propagation of the one or more communication services from one or more components of networks 107-113 for optimized distribution of communication services within a certain infrastructure.

In one embodiment, the data processing module 207 may be configured to parse the data entry based on the type of information, a contextual criterion, or a combination thereof associated with the at least one account. The type of information may include data type information, content information, criterion information etc. The parsing of data information may include analyzing the data by parts. For example, the request may contain a query or metadata specifying a type of information requested and/or a contextual criterion for filtering the requested information.

In one embodiment, an authentication module 209 authenticates users for interaction with the cloud orchestrator 101. The authentication procedure may be established a first time via a subscription process then later executed by the subscribed device for enabling profile activation. By way of example, the subscription procedure may include user entry of contact information, device information and user device usage preferences.

In one embodiment, the control module 211 controls the operations of the various other modules of the cloud orchestrator 101, including triggering execution of different modules accordingly. For example, the control module 211 identifies which services and/or applications are configured with an interface element for facilitating access to the communication services.

In one embodiment, the user interface module 213 facilitates generation of various interfaces for enabling users to interact with the cloud orchestrator 101. This includes, for example, generation of a login interface for enabling user registration and/or access to the communication services. By way of example, the user interface module 213 may generate different user interface elements for selection by registered users. It is noted that the user interface module 213 may be activated by way of various APIs or other function calls at a computing device of the third party cloud provider.

In one embodiment, the communication module 215 executes various protocols and data sharing techniques for enabling collaborative execution between the cloud orchestrator 101, data center 105 and the networks 107-113. In addition, the communication module 215 enables generation of signals for communicating with various elements of the service provider network, including various gateways, policy configuration functions and the like.

Figure 3:
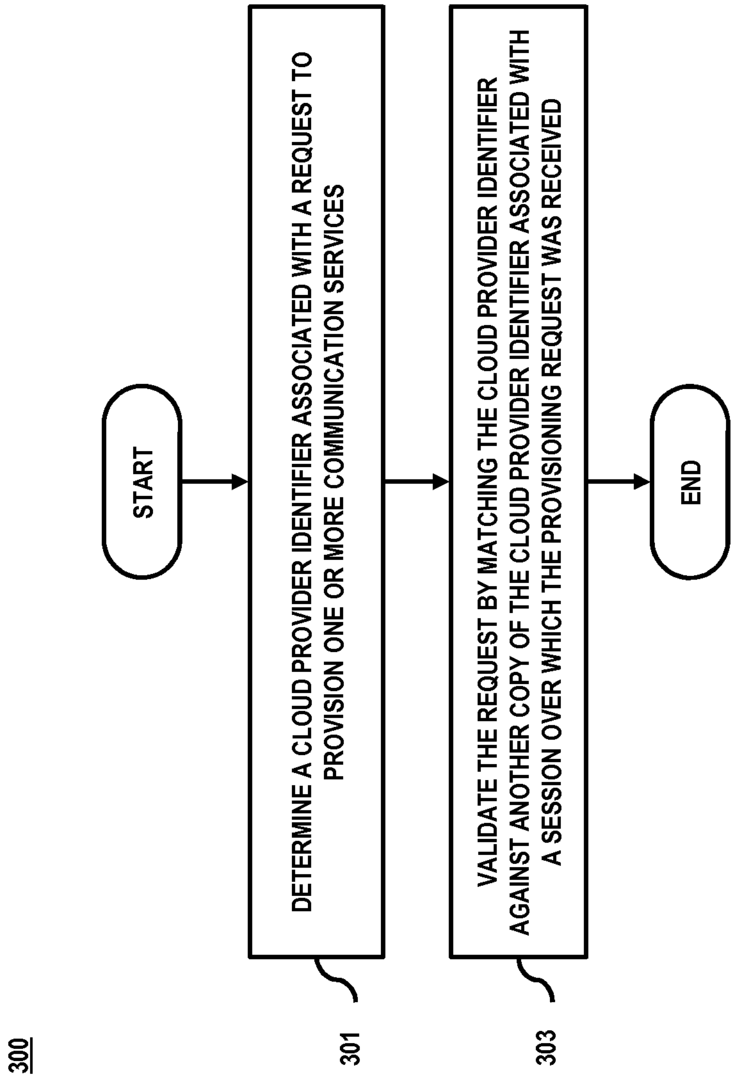
FIG. 3 is a flowchart of a process for determining a cloud provider identifier associated with a request and validating the request to provision one or more communication services, according to one embodiment.
Figure 7:
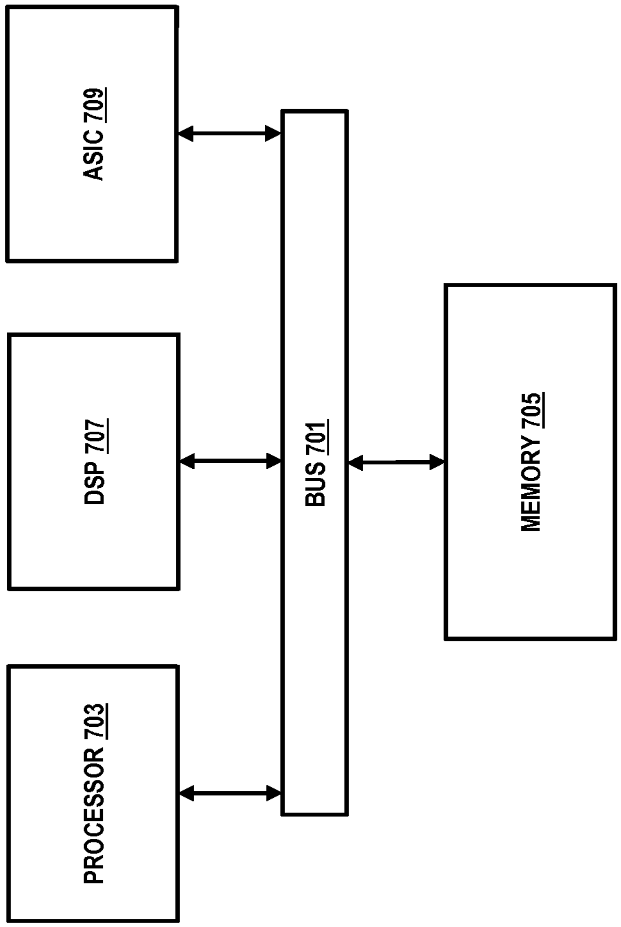
FIG. 7 is a diagram of a chip set that can be used to implement various exemplary embodiments.

FIG. 3 is a flowchart of a process for determining a cloud provider identifier associated with a request and validating the request to provision one or more communication services, according to one embodiment. In one embodiment, the cloud orchestrator 101 performs the process 300 and is implemented in, for instance, a chip set including a processor and a memory as shown in FIG. 7.

In step 301, the cloud orchestrator 101 may determine a cloud provider identifier associated with a request to provision one or more communication services. In one embodiment, the Cloud orchestrator 101 may create, manage and manipulate cloud resources, i.e., compute, storage and network, in order to realize user requests in a cloud environment. Further, the cloud orchestrator 101 may manage interconnection and interaction among cloud based unit. In one embodiment, the cloud orchestrator 101 may process and/or facilitate a processing of information associated with one or more cloud service providers to cause, at least in parts, a dynamic provisioning of communication services. In one embodiment, one or more communication services may be virtual private network (VPN) services whereby the cloud orchestrator 101 may cause, at least in part, a dynamic provisioning of VPN services from one or more cloud service provider to a client network. In one embodiment, the one or more virtual private network connection may be established over a packet-switched data network according to a multiprotocol labeling switching protocol. In another embodiment, one or more communication services may be provisioning of bandwidth on demand between cloud provider data centers, cloud provider data center and a client site or cloud Data center to a VPN. In one scenario, the conventional provisioning of bandwidth takes significant time, whereby the customer often requests and purchases enough bandwidth to handle their peak communication needs. This translates into the clients paying for more bandwidth than is needed and creates wasted resources. Thereby, provisioning of network services, specifically bandwidth on demand satisfies the user's requirement while aiming at maximizing, at the same time, resource utilization.

In step 303, the cloud orchestrator 101 may validate the request by matching the cloud provider identifier against another copy of the cloud provider identifier associated with a session over which the provisioning request was received. In one embodiment, a valid request from a cloud service provider must pass a check, whereby the cloud orchestrator 101 may validate the request to provision one or more communication services. In one embodiment, a cloud provider identifier may be a string entered by a cloud service provider that is included in every request from the cloud service provider for provisioning of one or more communication services. In one embodiment, the cloud orchestrator 101 may match the cloud provider identifier of a request sending cloud service provider with another copy of the cloud provider identifier associated with a session to validate the request for provisioning one or more communication services. In one embodiment, the cloud orchestrator 101 may cause, at least in part, an orchestration of one or more network systems based, at least in part, on the matching and the requested service.

Figure 4:
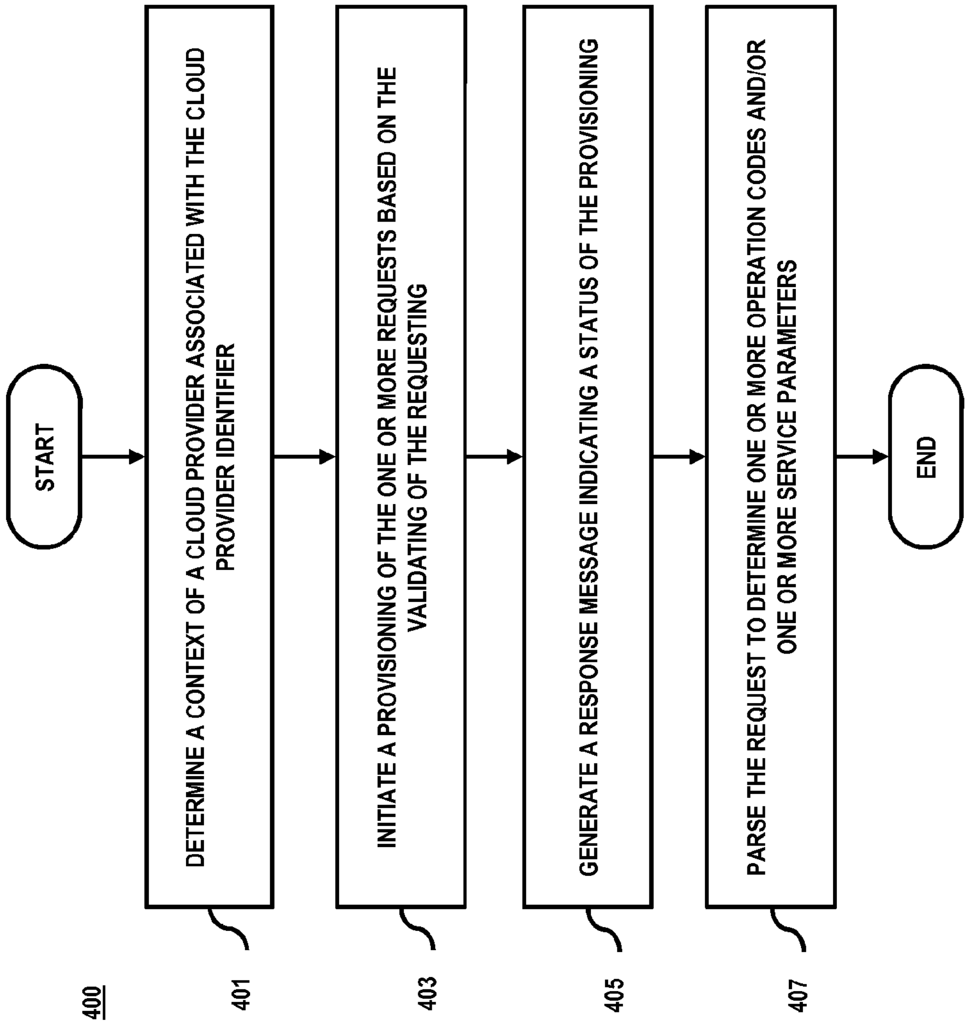
FIG. 4 is a flowchart of a process for generating a response message indicating a status of the provisioning based on the validating of the requesting, according to one embodiment.

FIG. 4 is a flowchart of a process for generating a response message indicating a status of the provisioning based on the validating of the requesting, according to one embodiment. In one embodiment, the cloud orchestrator 101 performs the process 400 and is implemented in, for instance, a chip set including a processor and a memory as shown in FIG. 7.

In step 401, the cloud orchestrator 101 determines a context of a cloud provider associated with the cloud provider identifier, wherein the validating of the request is further based on matching one or more parameters in the request against the context. In one embodiment, the one or more parameters include a customer identifier, a shared secret, service profile information, or a combination thereof. In one embodiment, a customer identifier may be a string assigned by a Network Service Providers (NSP) and shared with the customer. The customer may further share the customer identifier with the cloud provider at customer's will. The customer identifier must be included in every message and must match to that defined in the context of the cloud service provider. In one embodiment, a shared secret may be string selected by a customer and shared with the cloud service provider by the customer. A shared secret must be included in every message and must match to that defined in the context of the cloud service provider for that customer. In one embodiment, service profile information may be a set of rules associated with a cloud service provider and a customer, and must match that defined in the context of the cloud service provider and customer. In one embodiment, the service profile information includes port handle information, an order type, a connection type, a service type, a connection identifier, circuit handle information, connection attribute information, or a combination thereof. In one embodiment, port handle information may be a physical UNI port handle assigned by NSP. In one embodiment, an order type may be a service creation/modification/deletion authorization by a customer to a cloud service provider connected to a network. In one embodiment, a connection type may be Ethernet VLAN for provisioning of the one or more communication services. In one embodiment, a service type may be Ethernet Virtual Private Line (EVPL) for providing a point-to-point Ethernet connection, and/or Internet Protocol based Virtual Private Network (IPVPN) for sending and receiving data across shared or public networks as if they were an integral part of the customer private network, and/or Ethernet Private Line (EPL) for providing a point-to-point Ethernet Connection between a pair of dedicated user network interfaces (UNIs), with a high degree of transparency, and/or Ethernet Virtual Private Network (EVPN) or Virtual Private LAN Service (VPLS) for providing Ethernet based communication over networks and allowing geographically dispersed sites to share an Ethernet broadcast domain by connecting sites through pseudo-wires, and/or Public IP. In one embodiment, a connection identifier may be VLAN IDs for EVPL and EPL services. In one embodiment, circuit handle information may be a string assigned by NSP. In one embodiment, connection attribute information may be characteristics of the connection. In one scenario, transactions may occur at the connection level, for instance, the login timeout, or number of seconds to wait while trying to connect may be a connection attribute.

In step 403, the cloud orchestrator 101 initiates a provisioning of the one or more requests based on the validating of the requesting. In one embodiment, the one or more criteria for dynamic provisioning of the one or more communication services may be based, at least in part, on the validation of the request by matching the one or more parameters in the request to the context of a cloud provider. In one embodiment, the cloud orchestrator 101 initiates dynamic provisioning of network services, specifically VPN and bandwidth on demand. In other embodiments, the cloud orchestrator 101 initiates provisioning based on the parameters explained below under the FIG. 5 description.

In step 405, the cloud orchestrator 101 generates a response message indicating a status of the provisioning. In one embodiment, the status includes one or more success flags, one or more reject flags, one or more error codes, or a combination thereof. Each success flag, reject flag or error code may include a circuit identification, parameters used, timestamp, performance requested, reason codes, error codes, or combination thereof.

In step 407, the cloud orchestrator 101 parses the request to determine one or more operation codes, one or more service parameters, or a combination thereof, wherein the provisioning is further based on the one or more operation codes, the one or more service parameters, or a combination thereof.

Figure 5:
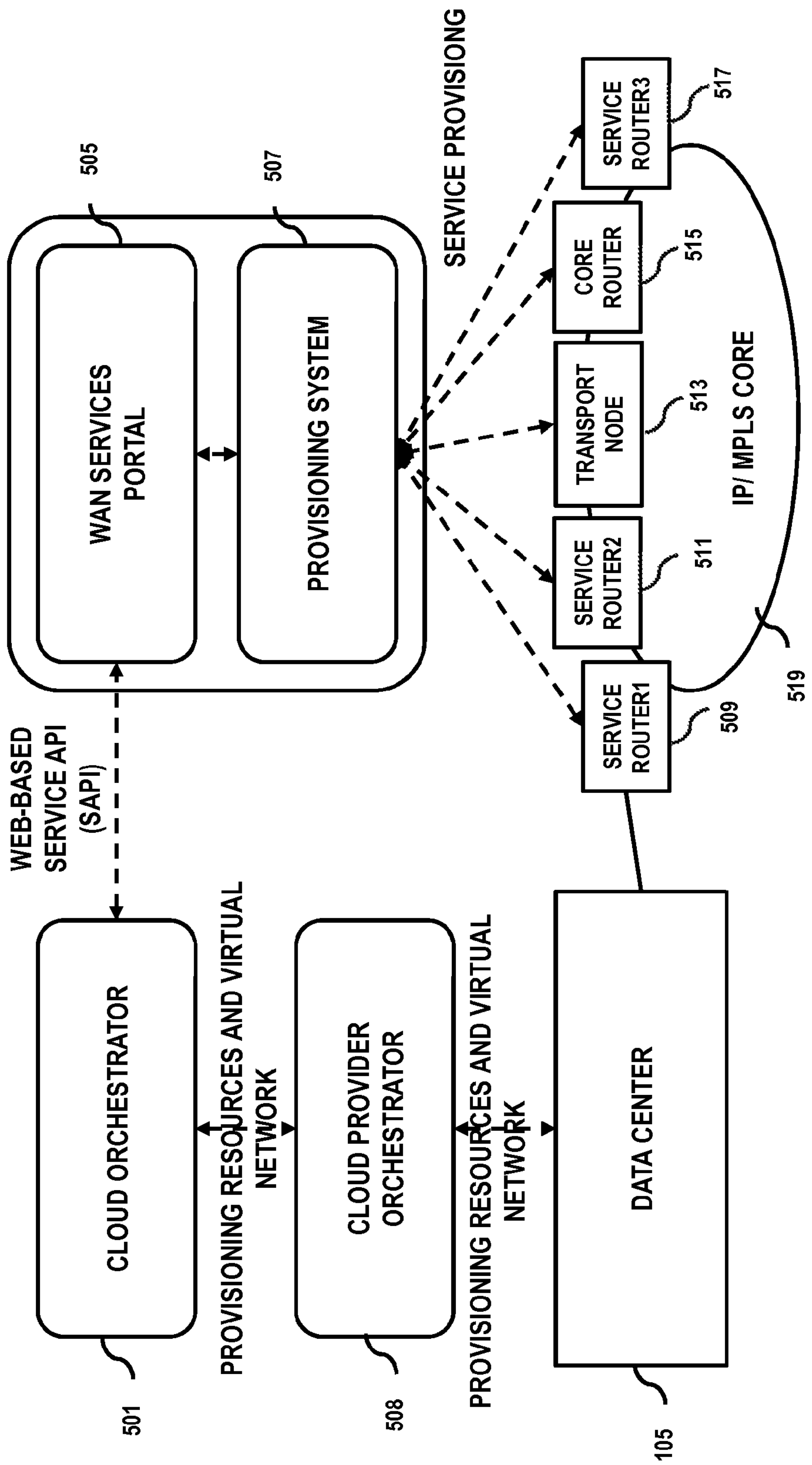
FIG. 5 is a diagram illustrating an orchestration of on-demand dynamic service provisioning flow for one or more communication services, according to one embodiment.

FIG. 5 is a diagram illustrating an orchestration of on-demand dynamic service provisioning flow, according to one embodiment. The efficiency and ubiquity of virtualization technologies have enabled widespread use of cloud computing platforms. While the basic Infrastructure-as-a-Service (IaaS) models of providing compute, storage and associated network services on-demand, may be the mainstay of cloud computing, thereby a more sophisticated cloud service abstractions may be offered. In one embodiment, the cloud computing includes utilization of a set of shared computing resources (e.g., servers) which are typically consolidated in one or more data center 105 locations. In one embodiment, the cloud orchestrator 501 may create, manage and manipulate cloud resources, i.e., compute, storage and network, in order to realize customer requests in a cloud environment. Further, the cloud orchestrator 501 may manage interconnection and interaction among cloud based unit. In one embodiment, data center 105 may be a storage facility, which may be shared between the users through Wide Area Networks (WAN) services portal 505.

In one embodiment, the network service provider 519 may be a MPLS core and may include transport node 513, core router 515, and service routers 1-3 509, 511, and 517 respectively. All of which may communicate with the provisioning system 507 in order to more efficiently set and use parameters. The service routers 1-3 may be used to provide a service to customers and communicate with data centers and the provisioning system 507. The service routers 509, 511 and 517 may be used to provide network services to customers and relay traffic from data centers 105. The core router 515 may be used to relay data across the IP/MPLS backbone. The transport node 513 may be used to transport data connections between service routers and core router, among core routers, between two data centers or any pairs of routers.

In one embodiment, a valid request from a cloud service provider must pass the following checks to be a valid request:

1. <Cloud_provider_ID> must match to that of the session over which the request is coming. In one embodiment, a <Cloud provider_ID> is a string entered by a cloud service provider orchestrator 518, and is included in every request from the cloud service provider;
2. <Customer_ID> must match to that defined in the context of the cloud service provider. In one embodiment, a <Customer ID> is a string assigned by a Network Service Provider (NSP) and shared with a customer, the customer may further share the <Customer ID> with the cloud service provider (trust relationship at customer will). The <Customer ID> must be included in every message. There may be one specified <Customer ID> per cloud service provider;
3. <Shared_secret> must match to that defined in the context of the cloud service provider. In one embodiment, a <Shared secret> is a string selected by customer and shared with cloud service provider by the customer—must be included in every message. There could be one specified <Shared_secret> per cloud service provider; and
4. The requested service profile name/circuit_id must match that defined in the context of the cloud service provider.

In one embodiment, a service creation/modification authorization by a customer to a cloud service provider connected to a network could be based on a customer defined profile specific to a cloud provider through a customer portal. In one embodiment, a valid request must pass the following checks which may be used in different logical combinations:

<Loc1-name>: string (physical UNI port handle assigned by NSP)
<Loc2-name>: string (physical UNI port handle assigned by NSP)
<Order> new/modify/delete
<Connection type> "Ethernet VLAN"
<Service type> EVPL/IPVPN/EPL/EVPN/VPLS/Public IP
<loc1—name—connection—ID> VLAN-ID
<loc2—name—connection—ID> VLAN-ID—Needed for EVP and EPL services
<Circuit Handle> "String" assigned by NSP
<Connection_Attributes>
  <locname_connection_BW> bandwidth (for EPL and EVPL services, both connections are specified)
    <Cos1, bandwidth>
    <Cos2, bandwidth>
    <Cos3, bandwidth>
    <Cos4, bandwidth>
    <CoS_N, bandwidth>
  <One-way delay bound> "Integer" specified for EPL and EVPL services"
  <Two-way delay bound> "Integer" specified for EPL and EVPL services".
<message_ID> included in request and copied into reply
Additional requests may include:
  Operation codes
    Get
  Information
    <circuit-ID> string assigned by NSP and handed to customer
    <service> EVPL/IPVPN/IPVPN/VPLS/EVPN
    <loc1_name> It can be wildcard for any-to any service of a list of locations
    <loc1_name> It can be wildcard for any-to any service of a list of locations
    <performance_requested> Delay, packet_loss, jitter
Responses by the system may include:
  Reply types
    Success
      >><circuit_ID>
      >>Performance_parameter_Name, timestamp, value
    Reject Flags (full or partial)
      >><circuit_Id>
      >>Successful reporting:: performance_parameter_Name, timestamp, value
      >>Rejected reporting:: performance_parameter_Name, reason_code
    Error codes
      >><circuit_ID>
      >>Error reporting: performance_parameter_Name, error_code The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

Figure 6:
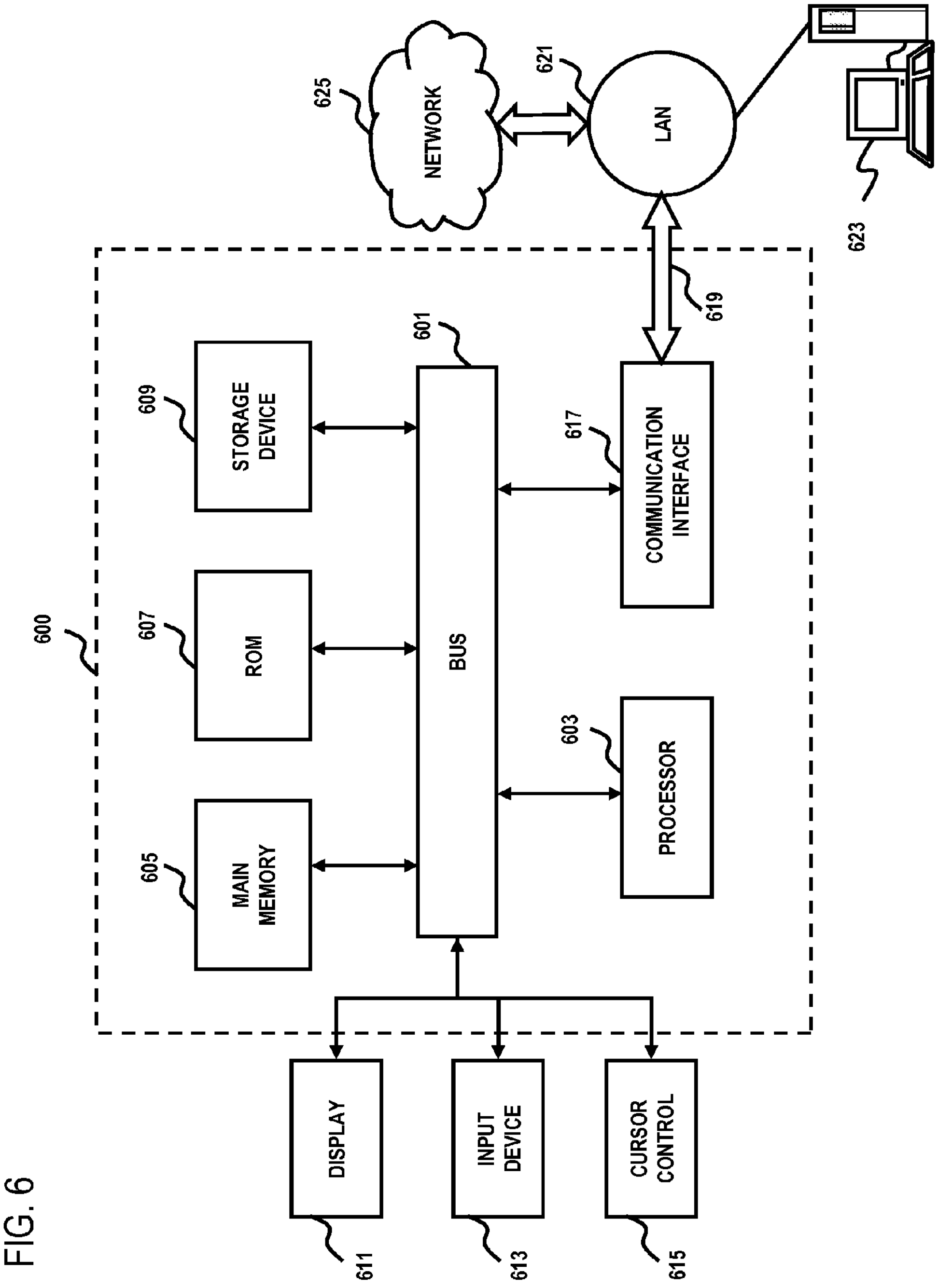
FIG. 6 is a diagram of a computer system that can be used to implement various exemplary embodiments.

The computer system 600 also includes a communication interface 617 coupled to bus 601. The communication interface 617 provides a two-way data communication coupling to a network link 619 connected to a local network 621. For example, the communication interface 617 may be an Ethernet interface or any other communication interface to provide a data communication connection to a corresponding type of communication line. Wireless links can also be implemented. In any such implementation, communication interface 617 sends and receives electrical, electromagnetic, or optical signals that carry digital data streams representing various types of information. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g., a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set 700 upon which an embodiment of the invention may be implemented. Chip set 700 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of FIGS. 2-4, 7, and 9A-9D.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

receiving, from a cloud service provider, a request to provision one or more communication services;

identifying a cloud provider identifier included in the request;

validating the request by matching the cloud provider identifier included in the request against another copy of the cloud provider identifier associated with a session over which the request was received; and provisioning the one or more communication services based on validating the request.

2. A method of claim 1, further comprising:

determining a context of a cloud provider associated with the cloud provider identifier, wherein the validating of the request is further based on matching one or more parameters in the request against the context.

3. A method of claim 2, wherein the one or more parameters include at least one of: a customer identifier, a shared secret, or service profile information.

4. A method of claim 3, wherein the service profile information includes at least one of: port handle information, an order type, a connection type, a service type, a connection identifier, circuit handle information, or connection attribute information.

5. A method of claim 1, further comprising:

generating a response message indicating a status of the provisioning.

6. A method of claim 5, wherein the response message includes at least one of: one or more success flags, one or more reject flags, or one or more error codes.

7. A method of claim 1, further comprising:

parsing the request to determine at least one of one or more operation codes or one or more service parameters, wherein the provisioning is further based on at least one of the one or more operation codes or the one or more service parameters.

8. An apparatus comprising:

a memory to store instructions; and a processor configured to execute the instructions to:

receive a request to provision one or more communication services;

identify a cloud provider identifier included in the request;

validate the request by matching the cloud provider identifier included in the request against another copy of the cloud provider identifier associated with a session over which the request was received; and provision the one or more communication services based on validating the request.

9. An apparatus of claim 8, wherein the processor is further configured to execute the instructions to:

determine a context of a cloud provider associated with the cloud provider identifier, wherein, when validating the request, the processor is further configured to validate the request based on matching one or more parameters in the request against the context.

10. An apparatus of claim 9, wherein the one or more parameters include at least one of: a customer identifier, a shared secret, or service profile information.

11. An apparatus of claim 10, wherein the service profile information includes at least one of: port handle information, an order type, a connection type, a service type, a connection identifier, circuit handle information, or connection attribute information.

12. An apparatus of claim 8, wherein the processor is further configured to execute the instructions to:

generate a response message indicating a status of the provisioning.

13. An apparatus of claim 12, wherein the response message includes at least one of: one or more success flags, one or more reject flags, or one or more error codes.

14. An apparatus of claim 8, wherein the processor is further configured to execute the instructions to:

parse the request to determine one or more operation codes or one or more service parameters, wherein, when provisioning the one or more communication services, the processor is further configured to execute the instructions to provision the one or more communication services based on at least one of the one or more operation codes or the one or more service parameters.

15. A system comprising:

an analytics platform, implemented in hardware, configured to:

receive a request to provision one or more communication services;

identify a cloud provider identifier included in the request to provision one or more communication services;

validate the request by matching the cloud provider identifier included in the request against another copy of the cloud provider identifier associated with a session over which the request was received; and provision the one or more communication services based on validating the request.

16. A system of claim 15, wherein the analytics platform is further configured to:

determine a context of a cloud provider associated with the cloud provider identifier, wherein, when validating the request, the analytics platform is further configured to validate the request based on matching one or more parameters in the request against the context.

17. The system of claim 16, wherein the one or more parameters include at least one of: a customer identifier, a shared secret, or service profile information.

18. A system of claim 15, wherein the analytics platform is further configured to:

generate a response message indicating a status of the provisioning.

19. The system of claim 18, wherein the response message includes at least one of: one or more success flags, one or more reject flags, or one or more error codes.

20. The system of claim 15, wherein the analytics platform is further configured to:

parse the request to determine one or more operation codes or one or more service parameters, and wherein, when provisioning the one or more communication services, the analytics platform is further configured to provision the one or more communication services based on at least one of the one or more operation codes or the one or more service parameters.

* * * * *